US009973732B1

(12) United States Patent
Goetz

(10) Patent No.: US 9,973,732 B1
(45) Date of Patent: May 15, 2018

(54) DEVICE SELECTION FOR VIDEO BASED COMMUNICATIONS

(71) Applicant: Amazon Technologies, Inc., Seattle, WA (US)

(72) Inventor: Jeromey Russell Goetz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/661,488

(22) Filed: Jul. 27, 2017

(51) Int. Cl.
*H04N 7/15* (2006.01)
*G06K 9/00* (2006.01)
*H04N 5/232* (2006.01)
*H04N 5/262* (2006.01)

(52) U.S. Cl.
CPC ........... *H04N 7/15* (2013.01); *G06K 9/00288* (2013.01); *H04N 5/23219* (2013.01); *H04N 5/2628* (2013.01)

(58) Field of Classification Search
None
See application file for complete search history.

(56) References Cited

U.S. PATENT DOCUMENTS

| 2016/0014324 | A1* | 1/2016 | Fan | H04N 7/181 348/207.11 |
| 2016/0070334 | A1* | 3/2016 | Frank | G06F 17/28 713/323 |
| 2016/0330966 | A1* | 11/2016 | Zhu | A01N 25/04 |
| 2017/0010647 | A1* | 1/2017 | Frank | G06F 17/28 |
| 2017/0223311 | A1* | 8/2017 | Kim | H04N 7/147 |

* cited by examiner

*Primary Examiner* — Creighton Smith
(74) *Attorney, Agent, or Firm* — Lee & Hayes, PLLC

(57) ABSTRACT

This disclosure is directed to methods, apparatuses, and systems for facilitating video communications between users in environments including a plurality of imaging devices. For example, an environment can include first and second imaging devices having associated fields of view providing multiple perspectives of a user. Upon initiating a video communication session, a network device can receive image data from the imaging devices to determine an identity of a user. A user profile of the user can include preferences for the communication, such as device selection, zoom selection, audio selection, subject framing, and the like. Further, the network device can utilize machine learned algorithms to determine an optimal view of the user for the video communication based on the fields of view associated with each imaging device. The network device can intelligently add users to a communication session and provide output to devices to provide a seamless videoconferencing experience.

20 Claims, 7 Drawing Sheets

DEVICE SELECTION FOR VIDEO BASED COMMUNICATIONS

BACKGROUND

Homes are becoming more connected with the proliferation of computing devices such as desktops, tablets, entertainment systems, and portable communication devices. As these computing devices evolve, different ways have been introduced to allow users to interact with them, such as through mechanical devices (e.g., keyboards, mice, etc.), touch screens, motion, and gesture. Another way to interact with computing devices is through natural-language input such as speech input and gestures. Further, users can interact with a plurality of devices, often simultaneously or in close proximity, which can present challenges for controlling such devices. Discussed herein are technological improvements for, among other things, these devices and systems.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
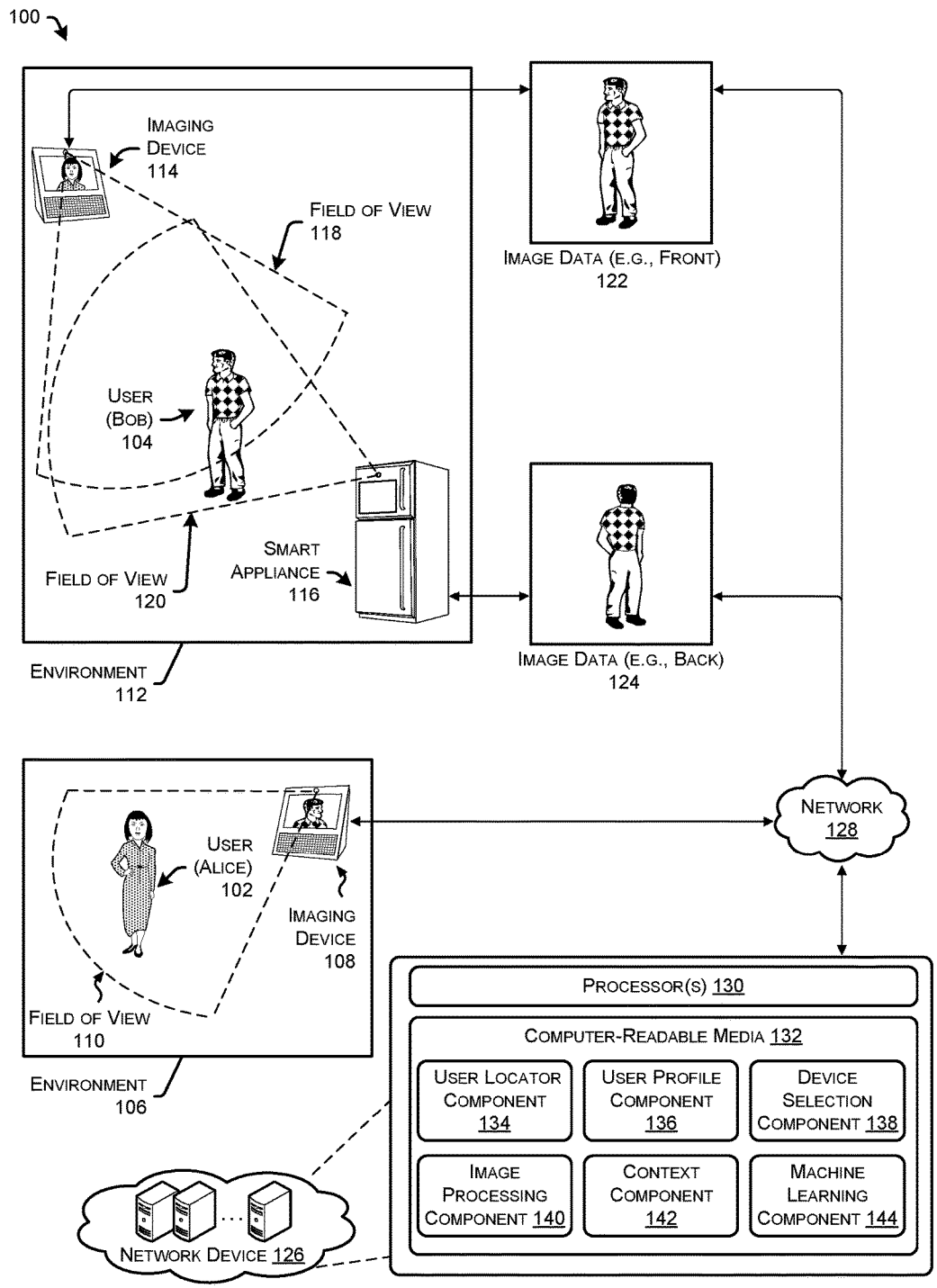
FIG. 1 is a schematic diagram of an illustrative architecture including at least two imaging devices for facilitating a video communication between users.

This disclosure describes methods, apparatuses, and systems for facilitating video communications between users in environments including a plurality of imaging devices. For example, an environment can include a first imaging device having a first field of view and a second imaging device having a second field of view. When a video communication is to be conducted in the environment, the first imaging device and the second imaging device can provide data to a network device, which can analyze the image data (e.g., using facial detection/recognition techniques) to determine an identity of the user represented in the data. Further, a user can be identified and located by monitoring a radio frequency (RF) signal associated with a device that is carried or worn by a user, and/or by voice recognition techniques. After determining an identity of a user, the network device can determine a user profile associated with the user, which can include preferences associated with conducting a video communication. For example, preferences can be associated with device selection, zoom selection, audio selection, subject framing, image composition, etc. Further, one or more machine learned algorithms can be utilized to determine an optimal view of the user for the video communication based on the fields of view associated with each imaging device.

The network device can receive data from the first imaging device and the second imaging device and monitor the data to determine, based at least in part on the preferences, which portion of the data to provide to another party of the video communication, such as a far-end display receiving data associated with the video communication. Further, the network device can perform automated speech recognition (ASR) on audio captured from an environment to determine a context of a conversation and/or to determine which user out of a plurality of users is a person of interest for the video communication. Further, as the user moves around his or her environment, the network device can select data from another device to be provided as the imaging stream for the video communication, with the network device determining an optimal source of image data and audio data, as well as how to present the data at a far-end destination of the video communication.

In a near-end environment with at least two users, the network device can receive data from one or more imaging devices and analyze the data to determine a conversation score associated with individual users. For example, a conversation score can represent a level of engagement of the user in the communication, and can determine whether the network device should "follow" the user as the user moves about the environment, for example, or whether the user can be emphasized in the video communication. For example, a conversation score can be based at least in part on one or more of a location of the user in a field of view of the imaging device, a context of speech of the user (e.g., determined using ASR), movement of the user, preferences associated with a user profile of the user, etc. In some instances, the conversation score can be used to determine a size of image data representing the user on a far-end device of the video communication. As discussed herein, a near-end device can be considered to be a source of data (e.g., an imaging device capturing data), while a far-end device can be considered to be a destination of the data (e.g., a display presenting at least a portion of the data). In some instances, an imaging device can be panned, tilted, or otherwise manipulated to track one or more users based in part on a conversation score. Further, the network device can crop a portion of image data based on a resolution of the data, a location of a person of interest, etc.

As a conversation is initiated, the network device can instruct one or more devices (e.g., imaging devices) to transmit data to the network device to determine which device of the one or more devices is to be a primary device. In some instances, the network device can provide data captured by the near-end imaging device to a far-end display to facilitate the video communication. In some instances, while the primary device is providing data to the network device at a first rate (e.g., first bit rate, first frame rate, first resolution, etc.), other imaging devices can be providing data to the network device at a second rate (e.g., second bit rate, second frame rate, second resolution, etc.). In some cases, the second rate can be lower (or represent lower quality) than the first rate. For example, an imaging device designated as the primary device can be capturing and providing data to the network device at a first rate of 60 frames per second (FPS), while a secondary device can be capturing data and/or providing data to the network device at a second rate of 2 FPS. If the network device determines that the secondary device can provide optimal image data representing the, the network device can instruct the secondary device to increase the rate (e.g., quality) at which data is captured and/or provided by the secondary device to the network device, in advance of transitioning the far-end stream from the primary device to the (current) secondary device, which can be designated at the next primary device.

In some instances, an environment can include an array of devices that are configured to perform an array of operations. To illustrate, an environment can include devices such as televisions, set-top boxes, microphones, speakers, audio systems, imaging devices, computers, computing devices, smartphones, telephones, tablets, modems, routers, lights, dishwashers, washing machines, coffee machines, refrigerators, door locks, window blinds, thermostats, garage door openers, air-conditioning units, humidifiers, dehumidifiers, alarm systems, motion sensors, biometric sensors, pressure sensors, radio frequency sensors, ovens, microwaves, and the like. These devices can be capable of coupling to a network (e.g., a LAN, WAN, etc.) and/or can be capable of communicating with other devices via wireless radio communication (e.g., Wi-Fi, Bluetooth, Zigbee, Z-Wave, LoRa, etc.). As such, these devices can be utilized to locate a user within an environment, and/or can include functions and capabilities that can be grouped together to facilitate communications that can otherwise not be possible if the devices remained as standalone devices. These devices can be controllable by a user remotely, such as via a graphical user interface (GUI) on a mobile phone of the user, via voice commands of the user, via gestures of the user, or the like.

In some instances, the environment includes a device configured to receive voice commands from the user and to cause performance of the operations requested via these voice commands. Such a device, which can be known as a "voice-controlled device," can include one or more microphones for capturing audio signals that represent or are otherwise associated with sound from an environment, including voice commands of the user. The voice-controlled device can also be configured to perform automated speech recognition (ASR) on the audio signals, or can be configured to provide the audio signals to another device (e.g., a device of a network device) for performing the ASR on the audio signals. After the voice-controlled device or another device identifies a voice command of the user, the voice-controlled device or the other device can attempt to direct the requested operation to be performed.

In some instances, the voice-controlled device can be configured to initiate a communication between two users. For instance, a user can issue a voice command to the voice-controlled device to "Connect Alice to Bob" or to "Connect me to Bob." The voice-controlled device or another device can perform ASR on a captured audio signal to identify the command ("connect") along with the referenced users ("Alice" and "Bob"). Similarly, a communication can be initiated using a GUI of a computing device or using a gesture-based imaging system. Based on the user requests, the network device (e.g., a server computer remote from a user environment or located at the user environment) can locate the users "Alice" and "Bob," and can determine a primary device of one or more devices at the respective locations of the users for use in the video communication, for example. In some instances, a location of a user can be continuously tracked and stored in memory at a network device. In such a case, when a user request is received to initiate a communication, the location can be retrieved from memory and provided to initiate a video communication at the respective location.

In some instances, a user can be located within a room or a zone associated with an environment, such as a home of the user. In some instances, a user environment can include imaging devices that can image the environment and perform facial recognition to determine that the user (e.g., "Alice" or "Bob") is in a particular room or zone of an environment. In some instances, it may not be possible to identify a user with certainty, and an environment can monitor other sensor data associated with a user to improve a certainty or confidence level of an identity and/or location of the user. For example, the user environment can include sensors to monitor a signal strength of a radio frequency (RF) signal associated with a user or associated with a computing device, such as a smartphone, or wearable device, such as a smartwatch, of a user. Based upon a received signal strength indicator (RSSI), RF localization or triangulation, or other techniques, the system can increase or decrease the confidence level of an identity and/or a location of the user. In some instances, various smart appliances (e.g., a lamp, a refrigerator, etc.) can monitor a RF signal associated with a user and transmit information relating to the signal strength to the network device for use in determining the identity and/or location of the user. Similarly, in environments with multiple voice-controlled devices (or multiple devices capturing audio), a location of a user can be determined by comparing the amplitude or strength of a received audio signal between the various devices.

In some instances, the location of a user is tracked and updated as the user moves from one location to another. The location of the user is stored in memory, and updated based in part on a location event, which can correspond to a change in location of the user. In some instances, when a communication is initiated between a first user and a second user, the first user can receive the location of the second user, and can receive updates of the location of the second user as the user moves about an environment.

After a location of a user is determined, a device group can be accessed in an environment associated with the location. For example, a group of devices can include a plurality imaging devices that can be utilized with the network device to determine an optimal perspective, field of view, emphasis, etc., of data captured by the group of devices. For example, in an environment where a first imaging device captures a front of a user and a second imaging device captures a back of the user, the network device can select the first imaging device as the primary device for the video communication. In some instances, the network device can further instruct the first imaging device to pan, tilt, and/or zoom to capture data of the user based on user preferences, machine learning algorithms, etc., to present an optimal image of the user. In some cases, a device group can be determined expressly (e.g., receiving one or more indications from a user associating devices with a group identifier) or implicitly. In the case of implicit group generation, the network device can receive imaging data from the first imaging device and the second imaging device to determine if the imaging devices have overlapping fields of view. In such a case, a movement (e.g., of the user) captured by the first imaging device could be captured by the second imaging device as well, and the network device can determine that the first and second imaging devices are associated with a same environment. In some cases, the first and second imaging devices can be located without overlapping fields of view. In such a case, the network device can determine an identity of a user, monitor movement of the user in a first field of view, determine that the user has left the first field of view, and determine that the user has appeared in the second field of view. Based on an analysis of the motion of the user (e.g., by determining a speed and/or distance traveled by the user), the network device can determine that the imaging devices are proximately located, and can associate the first imaging device and the second imaging device with a same group identifier.

The methods, apparatuses, and systems described herein can be implemented in a number of ways. Example implementations are provided below with reference to the following figures.

FIG. 1 is a schematic diagram of an illustrative architecture 100 including at least two imaging devices for facilitating a video communication between users. In general, the architecture 100 illustrates a user 102 (e.g., "Alice") and a user 104 (e.g., "Bob") conducting a video communication.

The user 102 (e.g., "Alice") is located in an environment 106 that includes an imaging device 108 having an associated field of view 110. The imaging device 108 is capable of capturing video and audio, as well as presenting video and audio, in connection with a video communication. The field of view 110 can correspond to an area that can be captured by an imaging element (e.g., an image sensor) of the imaging device 108.

The user 104 (e.g., "Bob") is located in an environment 112 that includes an imaging device 114 and a smart appliance 116. In some instances, both of the imaging device 114 and the smart appliance 116 can capture video and audio, and can present video and audio, for example, in connection with the video communication. Thus, the smart appliance 116 (e.g., illustrated as a refrigerator) can include functionalities of an imaging device. As illustrated, the imaging device 114 is associated with a field of view 118, and the smart appliance 116 is associated with a field of view 120.

As illustrated in FIG. 1, the imaging device 114 is positioned in the environment 112 to capture image data of the user 104 represented as the image data 122. For example, because the user 104 is facing towards the imaging device 114, the image data 122 represents the front of the user 104. As the user 104 is facing away from the smart appliance 116, image data 124 captured by the smart appliance 116 represents the back of the user 104.

In some instances, the various types of communication between the user 102 and the user 104 can include, but are not limited to, video, audio, text, multi-media and/or any other way of providing data representing human-understandable information. For example, in a case where the user 102 is at home and initiates a video communication with the user 104 while the user 104 is operating a vehicle, the communication can include converting the conversation from one type of communication to another. For example, audio from the user 102 can be received at a voice-controlled device, converted to text and sent as a text message (e.g., an SMS or MMS) to the user 104. As the text message is received by the user 104, the text message can optionally be converted into speech that is presented to the user 104 at the vehicle of the user 104.

As can be understood in the context of this disclosure, the environments 106 and 112 can include any number of devices having any associated functionality. For example, the environments 106 and 112 can include, but are not limited to, one or more of: televisions, set-top boxes, microphones, speakers, audio systems, imaging devices, computers, computing devices, smartphones, telephones, tablets, modems, routers, lights, dishwashers, washing machines, coffee machines, refrigerators, door locks, window blinds, thermostats, garage door openers, air-conditioning units, humidifiers, dehumidifiers, alarm systems, motion sensors, biometric sensors, pressure sensors, radio frequency sensors, ovens, microwaves, and the like. In some instances, the aforementioned devices can include wireless connectivity, and/or capabilities to capture and/or present video and/or audio.

As data is captured by the imaging devices 108 and 114, and the smart appliance 116, the data can be provided to one or more network devices 126 via one or more networks 128. In some instances, the imaging devices 108 and 114, the smart appliance 116, and network device 126 can communicatively couple to the network 128 via wired technologies (e.g., wires, USB, fiber optic cable, etc.), wireless technologies (e.g., Wi-Fi, RF, cellular, satellite, Bluetooth, etc.), or other connection technologies. The network 128 is representative of any type of communication network (e.g., the internet), including data and/or voice networks, and can be implemented using wired infrastructure (e.g., cable, CAT5, fiber optic cable, etc.), a wireless infrastructure (e.g., Wi-Fi, RF, cellular, microwave, satellite, Bluetooth, etc.), and/or other connection technologies.

In general, the network device 126 receives image data and/or audio data from devices in the environments 106 and 112, respectively, and performs a variety of operations to provide the data to the respective destinations. For example, data captured by the imaging device 114 and the smart appliance 116 can be provided to the network device 126, which can determine to provide at least a portion of the image data 122 for presentation via the imaging device 108. Similarly, the imaging device 108 can capture data of the user 102 and provide the data to the network device 126, which in turn can provide the data for presentation via the imaging device 114 and/or the smart appliance 116. In some instances, and as illustrated in FIG. 1, the network device 126 can selectively provide data of the environment 106 for presentation via the imaging device 114 (e.g., based on the user 104 facing the imaging device 114). As discussed herein, one or more preferences associated with a user profile associated with the user 104, for example, can determine, at least in part, how data is captured and presented in the context of a video communication.

For example, in an environment including multiple imaging devices, the network device 126 can select between devices to provide an optimal image to a far-end device. In an environment including a single imaging device, for example, the network device 126 can control the image data based on user preferences, such as zooming, panning, cropping, etc., based on preferences and/or based on a representation of the user in image data.

The network device 126 can include one or more processors 130 and one or more computer-readable media 132 including a user locator component 134, a user profile component 136, a device selection component 138, an image processing component 140, a context component 142, and a machine learning component 144.

The user locator component 134 can include functionality to receive data from devices in the environments to locate a user in an environment. For example, the user locator component 134 can receive data from one or more of imaging devices, audio devices, radio frequency devices, biometric devices, and the like, to determine a location of a user in an environment and/or to determine an identity of the user in the environment.

For example, the user locator component 134 can receive data from one or more sensors capable of providing images (e.g., the imaging device 114, the smart appliance 116, etc.) or sensors indicating motion (e.g., a motion sensor). In some instances, the user locator component 134 can perform facial recognition or image analysis to determine an identity of a user and to associate that identity with a user profile associated with the user. In some instances, the user locator component 134 can determine a confidence level associated with a determination of the location and/or identity of the user. In some instances, the user locator component 134 can be used in conjunction with other devices and/or modules to determine when a user is moving to a new location within the environment 112. In some instances, the user locator component 134 can receive data from one or more imaging devices to determine a layout of a zone or room, and/or to determine which devices are in a zone and where they are located.

Further, the user locator component 134 can receive data from one or more sensors capable of providing an audio signal (e.g., the imaging device 114, the smart appliance 116, etc.) to facilitate locating a user. In some instances, the user locator component 134 can perform audio recognition (in conjunction with other modules of the network device 126, for example) on an audio signal to determine an identity of the user and an associated user profile. Further, in some instances, the imaging device 114 and/or the smart appliance 116 can provide an audio signal to the user locator component 134. In some instances, the user locator component 134 is configured to receive an audio signal from one or more devices and can determine a sound level or volume of the source of the audio. In some instances, if multiple sources of audio are available, the user locator component 134 can determine that two audio signals correspond to the same source of sound, and can compare the relative amplitudes or volumes of the audio signal to determine a location of the source of sound. In some instances, individual devices can include multiple microphones and can determine a direction of a user with respect to an individual device. As discussed herein, in some instances, aspects of the network device 126 can be configured at a computing device (e.g., a local network device) within the environments 106 and/or 112. Thus, in some instances, the user locator component 134 operating on a computing device in the environment 112 can analyze all sound within the environment 112 (e.g., without requiring a wake word) to facilitate locating a user. In some instances, the user locator component 134 can perform voice recognition to determine an identity of a user.

In some instances, the environments 106 and/or 112 can include biometric sensors that can transmit data to the user locator component 134. For example, the user locator component 134 can receive data corresponding to fingerprints, iris or retina scans, thermal scans, weights of users, a size of a user, pressure (e.g., within floor sensors), etc., and can determine a biometric profile corresponding to a user. In some instances, the user locator component 134 can distinguish between a user and sound from a television, for example, based on a range of audio frequencies represented in audio data. Thus, the user locator component 134 can incorporate biometric information into a confidence level for determining an identity and/or location of a user. In some instances, the biometric information from the user locator component 134 can be associated with a specific user profile such that the biometric information uniquely identifies a user profile of a user.

The user locator component 134 can further utilize radio frequency (RF) localization to track devices that a user can carry or wear. For example, as discussed herein, the user 104 (and a user profile associated with the user 104) can be associated with a computing device such as a smartphone or a RF beacon. The computing device can emit RF signals (e.g., Wi-Fi, Bluetooth, etc.), which can be detected by other devices in the environment (e.g., imaging devices 108, 114, smart appliance 116, etc.). In some instances, devices that receive signals associated with the computing device can indicate to the user locator component 134 the respective strength of the signals (e.g., as a received signal strength indication (RSSI)). Thus, the user locator component 134 can compare the RSSI for various signals and for various appliances and can determine an identity and/or location of a user (with an associated confidence level). In some instances, the user locator component 134 can determine that a received RF signal is associated with a mobile device that is associated with a particular user. In some instances, a device (e.g., such as an access point, modem, router, imaging device, smart appliance, etc.) can be configured with multiple antennas to determine a location of a user relative to the device using beamforming or spatial diversity techniques. In such a case, the user locator component 134 can receive an indication of the direction of the user relative to an individual device. In some instances, a confidence level of the determination can depend on a relative difference of the RSSIs, determined by multiple antennas at a single device, or determined by multiple devices, for example.

In some instances, operations of the user locator component 134 are performed continuously in an environment, independent of any request to initiate a communication. For example, a location of a user can be determined, stored in memory, and updated as the user moves about the environment. In such a case, when a communication is initiated by a first user, the location of the second user stored in memory can be provided to the first user, and the location of the second location can be updated and provided to the first user as the second user moves about the environment.

The user profile component 136 can include one or more user profiles that include information and/or preferences of users. In some instances, the user profile component 136 can include household specific information including but not limited to, one or more shipping addresses, billing addresses, devices available for grouping, etc. In some instances, each user of a household can have their own associated user profile. For example, individual user profiles can include personalized information including but not limited to, preferred content, preferred devices, preferred connections, shopping history, biometric data (e.g., computer vision based facial recognition, fingerprint recognition, voice recognition), radio frequency data (e.g., a user's mobile telephone number, a user's mobile phone Bluetooth identification or Wi-Fi identification, a wireless identification associated with a wearable device (e.g., a smartwatch) of a user, etc.), and access restrictions (parental controls/adult content filters, etc.). For example, a user that is located and/or identified by the user locator component 134 can be mapped to a user profile based on facial recognition techniques.

In some example, the user profile component 136 can store in memory preferences for capturing data in a near-end environment and presenting at least a portion of the data in a far-end environment. For example, the preferences can include, but are not limited to, priorities of imaging devices (e.g., which device is to be a default device, ranked ordering of devices, etc.), limitation(s) on image data captured (e.g., whether to capture/present data representing a user's body, or whether to limit capture/presentation of data to a face of a user, above the waist, front-only images, etc.), restricted areas of an environment (e.g., for blurring of image data capturing such restricted areas), audio selection (e.g., devices for capturing and/or presenting data), reception preferences (e.g., whether to allow users to initiate a communication without express acceptance at a location), timing of preferences (e.g., dependent on a time of day, day of the week, etc.), pan/tilt/zoom/crop preferences (e.g., for image processing, device control, etc.), etc.

In some instances, the preferences can be associated with capturing data at a near-end location, and in some instances, the preferences can be associated with presenting data at a far-end location. For example, preferences can affect how data associated with the user is presented at a far-end location (e.g., Bob's preferences can inform the network device 126 how representations of Bob are presented to Alice), or preferences can affect how data is presented at a near-end location (e.g., Bob's preferences can inform the network device 126 how representations of Alice are presented to Bob).

In some instances, preferences can be based at least in part on an identity of users involved in a communication. For example, a communication between "Alice" and "Bob" can invoke different preferences than a communication between "Alice" and "Carol." Further, the one or more preferences can be based at least in part on a number of users involved in the communication, based on a number of devices available at a near-end location and/or a far-end location, etc.

The device selection component 138 can include functionality to determine which devices in an environment are available for use in a video communication, for example, and/or to select a device as a primary device for the video communication. As indicated above, the user profile component 136 can include information detailing devices (e.g., based on a device identifier, a group identifier, etc.) that are available in an environment. The device selection component 138 can use the device identifiers, for example, to cause the imaging device 114 and the smart appliance 116, for example, to capture data of the environment 112 to provide the data to the network device 126. The device selection component 138 can utilize one or more machine learning algorithms, such as a neural network, to determine an optimal view of the imaging devices, such that a user is represented in image data in an aesthetically pleasing manner, according to the one or more preferences established by a user, etc.

The image processing component 140 can include functionality to receive image data from one or more devices (e.g., the imaging devices 108 and 114, and/or the smart appliance 116) and process the data for presentation in connection with a video communication. In some instances, the image processing component 140 can perform zooming and/or cropping on image data to emphasize an area for presentation. In some instances, the image processing component 140 can prevent data (e.g., the image data 124) from being transmitted to an environment (e.g., the imaging device 108 in the environment 106) so that the image data 122 can be transmitted and presented instead. In some instances, the image processing component 140 can perform multiplexing on image data to present image data representing multiple users and/or locations for the video communication. In some instances, and as discussed in connection with FIG. 2, the image processing component 140 can process image data based at least in part on a conversation score associated with individual users.

In some instances, the image processing component 140 can perform operations based at least in part on capabilities of devices capturing and/or presenting data for the video communication. For example, if captured image data is at a first resolution and the display for presenting the image data is at a second resolution lower than the first resolution, the image processing component 140 can zoom or crop the image data so that the image data can be presented without distortion. For example, if the image data (e.g., 122) captured by the imaging device (e.g. 114) is 2 megapixels (2 MP) and a display of the imaging device (e.g., 108) has a resolution of 1024×768 pixels (e.g., 0.7 MP), the image processing component 140 can crop/zoom the image data up to 2.5 times without distortion.

The context component 142 can include functionality to analyze communication data, for example, to determine a context of users in the communication. For example, the context component 142 can receive image data, audio data, and/or data based at least in part on image data or audio data to determine a subject of the conversation, whether the conversation is to be supplemented with addition information, etc. The context component 142 can include a virtual assistant that can respond to voice commands, gestures, etc., represented in the communication data to provide responses or to perform an operation in response to the commands or gestures.

The machine learning component 144 can include functionality to determine an optimal view of a user during a communication to provide a seamless communication experience. For example, the machine learning component 144 can receive the image data 122 and 124 and determine that the image data 122 represents a "better" image of the user 104 than the image data 124. In some instances, the machine learning component 144 can be trained using training data that has been annotated or scored to indicate an optimal view of a user in a video communication. In some instances, the machine learning component 144 can use any machine learning algorithms, including but not limited to, neural networks, convolutional neural networks, decision forests, etc.

The machine learning component 144 can receive image data and determine a score associated with the image data indicating or evaluating a quality of the user represented in the image data. For example, a higher score can indicate a "better" or optimal image of the user represented in the image data, and can be based at least in part on a number of factors, including: composition of the image data; lighting of the image; a direction a user is facing relative to an imaging device; shadows across a face of a user; an amount of a face visible in the image data; a perspective of the user (e.g., from above, from below, from the left or right, etc.); etc.

In some instances, the machine learning component 144 can track the behavior of various users in the environment as a factor in determining a confidence level of the identity and/or location of the user, in determining a primary device for a communication, etc. By way of example, it can be the case that the user 104 adheres to a regular schedule, such that the user 104 is outside the environment 112 during the day (e.g., at work or at school). In this example, the machine learning component 144 would factor in past behavior and/or trends into determining the identity and/or location. Thus, the machine learning component 144 can user historical data and/or usage patterns over time to increase or decrease a confidence level of an identity and/or location of a user.

Further, the machine learning component 144 can track how devices are used over time to increase an accuracy of device selection for a video communication. For example, when multiple imaging devices detect a user, the machine learning component 144 can prioritize a device that is historically most active and/or most frequently used by the user. In one example, a device selection can be based at least in part on an amount of time a user is represented in image data captured by an imaging device (e.g., a user can primarily use a first imaging device and can momentarily walk into a field of view of a second imaging device, but the network device 126 can determine not to provide image data from the second imaging device based on a determination that the user is historically represented in the image data from the second imaging device for a brief period of time).

Additional details of the network device 126 are described in connection with FIG. 2.

Figure 2:
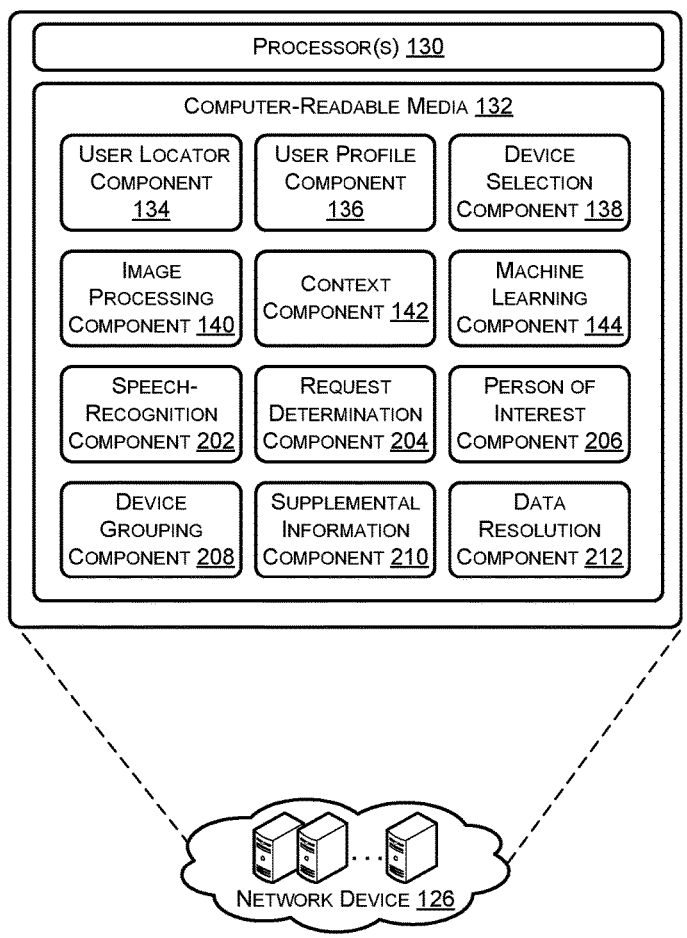
FIG. 2 is a schematic diagram of an illustrative architecture for managing a plurality of devices for providing a seamless video conferencing experience.

FIG. 2 is a schematic diagram of an illustrative architecture 200 for managing a plurality of devices for providing a seamless video conferencing experience. Such a seamless video conferencing experience can be provided by, in part, the network device 126.

The network device 126 can generally refer to a network-accessible platform—or "cloud-based service"—implemented as a computing infrastructure of processors, storage, software, data access, and so forth that is maintained and accessible via the network 128, such as the internet. Cloud-based services may not require end-user knowledge of the physical location and configuration of the system that delivers the services. Common expressions associated with cloud-based services, such as the network device 126, include "on-demand computing," "software as a service (SaaS)," "platform computing," "network accessible platform," and so forth. In some instances, cloud-based services can be provided via a remote network device. In some instances, some or all of the functionality of the network device 126 can be provided by a computing device located within the environments 106 and 112, and in some instances, a network device located in a user environment can be referred to as a local network device. For example, and without limitation, the user locator component 134 (discussed above) can be provided for the user 102 and the user 104 by a computing device at the environments 106 and 112, respectively. That is to say, a user can maintain a computing device at their home, for example, to function as a "hub" to coordinate activity and communication between individual devices and the network device, as discussed herein. For example, a location of a user can be determined by a computing device associated with each user apart from a "cloud-based service," to maintain privacy for each user.

As illustrated, the network device 126 comprises the one or more processors 130 and the computer-readable media 132 executable on the processors 130. The computer-readable media 132 (also referred to as computer-readable storage media) can store one or more modules including the user locator component 134, the user profile component 136, the device selection component 138, the image processing component 140, the context component 142, the machine learning component 144, a speech-recognition component 202, a request determination component 204, a person of interest component 206, a device grouping component 208, a supplemental information component 210, and a data resolution component 212.

In some cases, a communication can be initiated by a user via a voice command received by the imaging device 108 or 114, the smart appliance 116, or any other devices that can be present in an environment (e.g., the environments 106 and 112). For example, in response to one of the imaging device 108 or 114, or the smart appliance 116 identifying the user 102 and/or 104, and/or in response to the user 102 and/or 104 speaking a predefined wake word, the particular device can begin uploading an audio signal (or image data including an audio signal) representing sound captured in the environment 106 or 112, respectively, up to the network device 126 over the network 128.

In response to receiving this audio signal, the speech-recognition component 202 can begin performing automated speech recognition (ASR) and/or natural language understanding on the audio signal to generate text and identify one or more user voice commands from the generated text. For instance, with reference to FIG. 1, a user request (e.g., from the user 102) can include the speech "Connect Alice to Bob." As the audio signal representing this sound is uploaded to the speech-recognition component 202, the component 202 can identify the user requesting to initiate a communication between "Alice" and "Bob." In some instances, the speech-recognition component 202 can include a voice recognition module that can determine an identity of a user based upon analyzing the audio signal including the speech of that user. Thus, in an example where the natural-language command includes "Connect me to Bob," the speech-recognition component 202 can determine that "me" corresponds to "Alice."

As indicated above, and in addition to or instead of identifying a user based on speech recognition, the network device 126 can utilize image data provided by one or more imaging devices to determine a gesture performed by a user, and/or utilize facial recognition techniques to determine an identity of a user.

As the speech is recognized by the speech-recognition component 202, the text of the speech can be passed to the request determination component 204 to determine the command indicated by the speech. For example, the request determination component 204 can include a contact list associated with a user profile of the requester (e.g., "Alice"), and can determine that "Bob" corresponds to an individual in the contact list associated with the user profile. In some instances, a request can be received as a gesture or as a GUI request, in which case the request determination component 204 can interpret the request as it comes. In some instances, if the identity of one or more users is unknown, or where there can be more than one possible user, the near-end device can follow up with additional questions to the users 102 or 104 to ascertain the identities of the users.

Further, the person of interest component 206 can include functionality to determine a conversation score associated with individual users in an environment to determine whether the person is to be a focus of the video communication, for example. The person of interest component 206 can perform operations for each of the environments 106 and 112. For example, with respect to the environment 106, the person of interest component 206 can determine that the user 102 is the only user in the field of view 110 associated with the imaging device 108, and therefore, the user 102 can be considered to be a person of interest in the environment 106. For example, the person of interest component can utilize face detection algorithms, body detection algorithms, etc., to determine that a face or body is present in image data. Similarly, the person of interest component 206 can determine that the user 104 is the only user in the fields of view 118 and 120, and thus the person of interest component 206 can determine that the user 104 is a person of interest. Additional details of the person of interest component 206 and examples of determining a person of interest are provided below in connection with FIG. 3.

In some instances, the device grouping component 208 can include functionality to determine one or more device groupings in an environment including a plurality of devices. For example, the environment 112 includes the imaging device 114 and the smart appliance 116, which may be included as a single group. Further, the group can be associated with a particular user profile (e.g., associated with the user 104), such that when a communication involving the user 104 is initiated or requested, data from the group of devices (e.g., the imaging device 114 and the smart appliance 116) can be provided to the network device 126 (e.g., to locate the user 104, to determine a primary device for the communication, etc.). As discussed above, device groups can be defined explicitly (e.g., via instructions from a user) or implicitly (e.g., by determining overlapping fields of view, or proximate fields of view).

Further, the device grouping component 208 can monitor, determine, and/or manage the capabilities of devices within individual environments 106 and 112. For example, the device grouping component 208 can include a database indicating whether individual devices can capture audio, output audio, capture video, and/or output video. Further, the device grouping component 208 can monitor technical specification such as bit rates, codecs, resolutions, frame rates, etc., and can monitor whether a device is in use, online, or offline. Further, the device grouping component 208 can include an interface allowing users to configure devices within their environment.

In some instances, the device grouping component 208 can include functionality to combine functions from various devices into a functionally grouped arrangement. For example, in the environment 112 of FIG. 1, the device grouping component 208 can group functions of the imaging device 114 and the smart appliance 116, such that the imaging device 114 can capture image data of the environment 112, while the smart appliance 116 can capture audio of the environment 112. Further, audio and video from the environment 106 can be presented by the imaging device 114 and the smart appliance 116 in any distributed manner. Thus, as a number of devices in an environment increases, the device grouping component 208 can group devices and determine which devices to capture and present image data and audio data in an environment in an optimal manner using available resources.

In some instances, the supplemental information component 210 can include functionality to access supplemental information associated with a communication and to present the supplemental information in connection with one or more devices involved in the communication. For example, the supplemental information component 210 can monitor a context of the communication determined by the context component 142 to determine a subject of a conversation, and accordingly, access additional information associated with the subject. For example, if the users 102 and 104 are discussing a dinner recipe while the user 104 is cooking, the supplemental information component 210 can access the dinner recipe (e.g., associated with a user profile of the user 104) and cause the dinner recipe to be presented on a display of the imaging device 108 or 114, or the smart appliance 116. In another example, if the users 102 and 104 are discussing the weather, the supplemental information component 210 can access weather information associated with the environments 106 and/or 112 for presentation at the environments. In another example, the supplemental information component 210 can access calendars, email, contact lists, search engines, etc., based on one or more requests uttered by the users 102 and/or 104.

In one example, if a user begins a conversation with a field of view of an imaging device, for example, and walks or otherwise navigates out of the field of view, the supplemental information component 210 can provide an annotation on a far-end display indicating a direction where the user was last seen.

In some instances, the data resolution component 212 can include functionality to increase and decrease resolution of data captured and/or presented by devices in communication with the network device 126. For example, as a communication is initiated, the network device 126 can request data from one or more devices at a first resolution, data rate, bit rate, codec, compression, etc. As a user is located, and/or as a device is designated as a primary device (e.g., capturing data that is provided to a far-end device), the data resolution component 212 can increase a resolution, data rate, bit rate, etc., and/or may vary a codec and/or compression associated with the data. In some instances, the data resolution component 212 can request an upgraded rate from a device providing data a lower rate upon determining that a user is likely to navigate to a location that would cause the particular device to be designated as the primary device.

In some instances, the data resolution component 212 can upgrade or downgrade a connection (e.g., a resolution, data rate, bit rate, frame rate, codec, compression, etc.) based upon device capabilities and/or user preferences or rules to provide seamless communications. In some instances, as a user moves from a first location in a first environment to a second location in the environment, the data resolution component 212 can blend voice and/or video data transmitted and presented at a second environment associated with another user. For example, a sound output at the second environment can include contributions from a first audio stream from the first location in the first environment and from a second audio stream from the second location in the first environment. With respect to video, the data resolution component 212 can cause video from the first and second location to be presented simultaneously (e.g., as a split screen showing multiple video streams) at the second environment so that a continuity of connection can be maintained.

In some instances, the data resolution component 212 can store additional technical features associated with each device, such as bit rates, codecs, color gamuts, frequency responses, resolutions, a network protocol, an availability status, etc.

Figure 3:
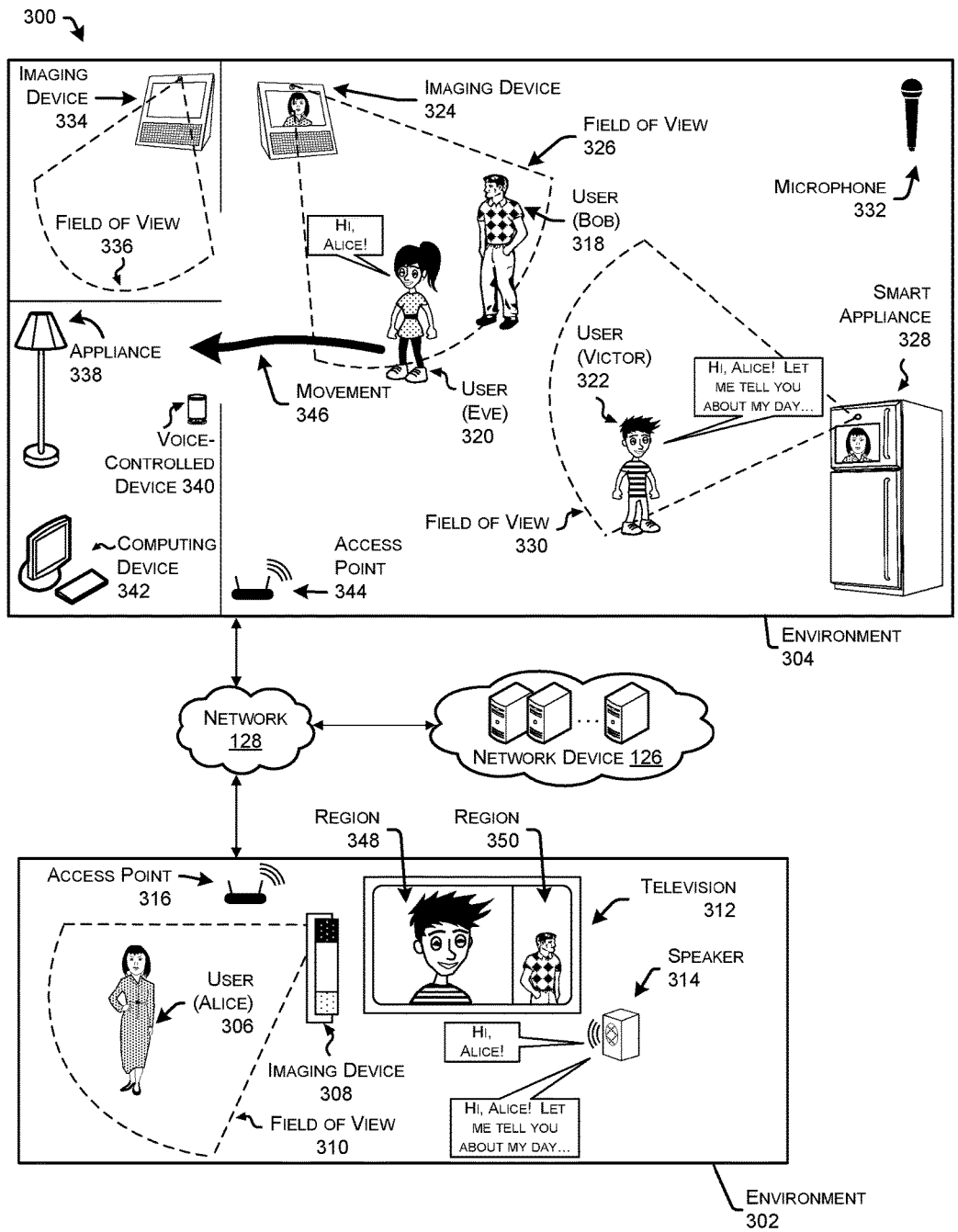
FIG. 3 is a schematic diagram of an illustrative architecture in which multiple users engage in a video communication.

FIG. 3 is a schematic diagram of an illustrative architecture 300 in which multiple users engage in a video communication. The architecture 300 includes environments 302 and 304 including multiple devices and multiple users, as discussed herein. Devices in the environments 302 and 304 are communicatively coupled to the network device 126 via the network 128, as discussed herein.

As illustrated, the environment 302 includes a user 306 ("Alice") and various devices, including but not limited to an imaging device 308 having an associated field of view 310, a television 312, a speaker 314, and the like. In some instances, the devices 308, 312, and 314 can be communicatively coupled via an access point 316, which can also provide connectivity with the network 128.

As further illustrated, the environment 304 includes a user 318 ("Bob"), a user 320 ("Eve"), and a user 322 ("Victor"). Further, the environment can include various devices, including but not limited to an imaging device 324 associated with a field of view 326, a smart appliance 328 having imaging capabilities and associated with a field of view 330, a microphone 332, an imaging device 334 associated with a field of view 336, an appliance 338, a voice-controlled device 340, a computing device 342, and the like. Further, the devices 324, 328, 332, 334, 338, 340, and 342 can include functionality to capture and/or present audio and/or images, and may be communicatively coupled with the network 128 and other devices via an access point 344.

As can be understood in the context of this disclosure, the environments 302 and 304 can include any number of devices, any number of users, any layout including individual rooms or zones, and the like.

The following example illustrates one use case for conducting a video communication in the environments 302 and 304 utilizing the network device 126. For example, the user 306 ("Alice") can initiate a conversation with the user 318 ("Bob") by speaking a wake word (e.g., "Computer . . . ") and uttering a command (e.g., "Connect me to Bob.") The imaging device 308 in the environment 302 can capture the audio uttered by the user 306 and can transmit the audio to the network device 126. The network device 126 can determine that the audio represents a request from Alice to initiate a communication with Bob. Based at least in part on one or more user preferences (and/or based at least in part on one or more commands), the network device 126 can determine that the communication is to be a video communication.

Upon determining the communication is to be a video communication, the network device 126 can access a user profile associated with the user 318 (e.g., "Bob") to determine that a group of devices is associated with the user profile. The network device 126 can instruct devices associated with the group of devices (e.g., the imaging device 324 and the smart appliance 328) to provide audio data and/or image data to the network device 126 so that the network device 126 can locate the user 318 and/or determine a device to be the primary device for the communication. That is, the network device 126 can receive image data from the imaging device 324 and the smart appliance 328 and can determine that the user 318 is represented in both image data. Further, the network device 126 can determine, based at least in part on facial detection/recognition algorithms and/or machine learning algorithms, that the image data captured by the imaging device 324 represents a "better" view of Bob than the image data captured by the smart appliance 328, and can designate the imaging device 324 as the primary device for the conversation. That is, the network device 126 can provide data captured by the imaging device 324 to be presented via the television 312 at the environment 302.

In some instances, the user 318 can be alone in the environment 304, and accordingly would be designated as a person of interest by default. However, in some instances, the user 320 "Eve" can enter the environment 304 and can enter the field of view 326 and utter "Hi, Alice!" However, the user 320 may be moving through the field of view 326, represented by movement 346. Based at least in part on the movement (e.g., speed, direction, length of time in the field of view 326, etc.), and based at least in part on the context of the utterance (e.g., "Hi, Alice!"), the network device 126 can associate a low conversation score with the user 320, and accordingly, can determine that the user 320 is not to be a person of interest. Accordingly, the network device 126 can determine not to provide image data representing the user 320 to the environment 302.

Next, the user 322 ("Victor") enters the environment 304 and stands within the field of view 330 and utters "Hi Alice! Let me tell you about my day . . . ". In some cases, the network device 126 can determine that the user 322 is a person of interest based at least in part on a location of the user 322 within the field of view 330, a speed of the user 322, a length of time in the field of view, a determination that the user 322 is viewing a display or imaging device associated with the smart appliance 328, a context of the utterance, etc. That is, the network device 126 can determine that the user 322 is engaging in the conversation, and can seamlessly integrate the user 322 into the conversation.

For example, the network device 126 can capture audio and video representing the user 322 and can provide the data to the environment 302. In some instances, and as represented on the television 312, the network device 126 can emphasize or highlight the data associated with the user 322, for example, by allocating a region 348 of the television 312 to a representation of the user 322, which is larger than a region 350 allocated to the user 318. As can be understood, the regions 348 and 350 are illustrative and are not intended to be limiting. For example, a size of the regions 348 and 350 can be based at least in part on conversation score associated with the users 318 and 322, respectively, a size of the display of the television 312, user preferences, etc. For example, if both Bob and Victor are engaged in the conversation, the regions 348 and 350 can be of equal size.

In one example, after the user 322 "Victor" finishes his portion of the conversation, Victor can utter "Computer, camera off . . . ," which can be received by the network device 126 to disable data capture and/or presentation at the smart appliance 328.

In some instances, the network device 126 can determine not to present image data of Bob and Victor on devices in the environment 304 (e.g., because Bob and Victor are located in the environment 304), although it is to be understood that the network device 126 can present representations of the conversation in any manner.

In one example, if the user 320 ("Eve") were to be considered a person of interest, and if Eve were to navigate to into the field of view 336, the network device 126 can determine to capture image data and/or audio data using the imaging device 324 to present in the environment 302, for example. In some cases, based on one or more preferences of the users (e.g., Alice, Bob, Eve, Victor, etc.) the imaging device 334 can be designated as an area not to be imaged. In some instances, if the field of view 326 captures image data associated with a restricted area, the network device 126 can utilized image processing techniques to obscure, omit, or otherwise prevent image data (and/or audio data) representing the restricted area from being presented to a far-end environment.

As illustrated in the environment 302, the imaging device 308, the television 312, and the speaker 314 can represent a functional arrangement. For example, the imaging device 308 can capture image data and audio data, the television 312 can present image data, and the speaker 314 can present audio data. Thus, the devices 308, 312, and 314 can be utilized in combination to provide capabilities for a video communication that otherwise may not have been possible using a single device.

Additional, functionally grouped arrangements can be utilized in the environment 304. For example, the microphone 332 can capture audio data of the environment 304, while the imaging device 324 captures image data and presents image data and audio data. The examples herein are for illustrative purposes and are not intended to be limiting.

Figure 4:
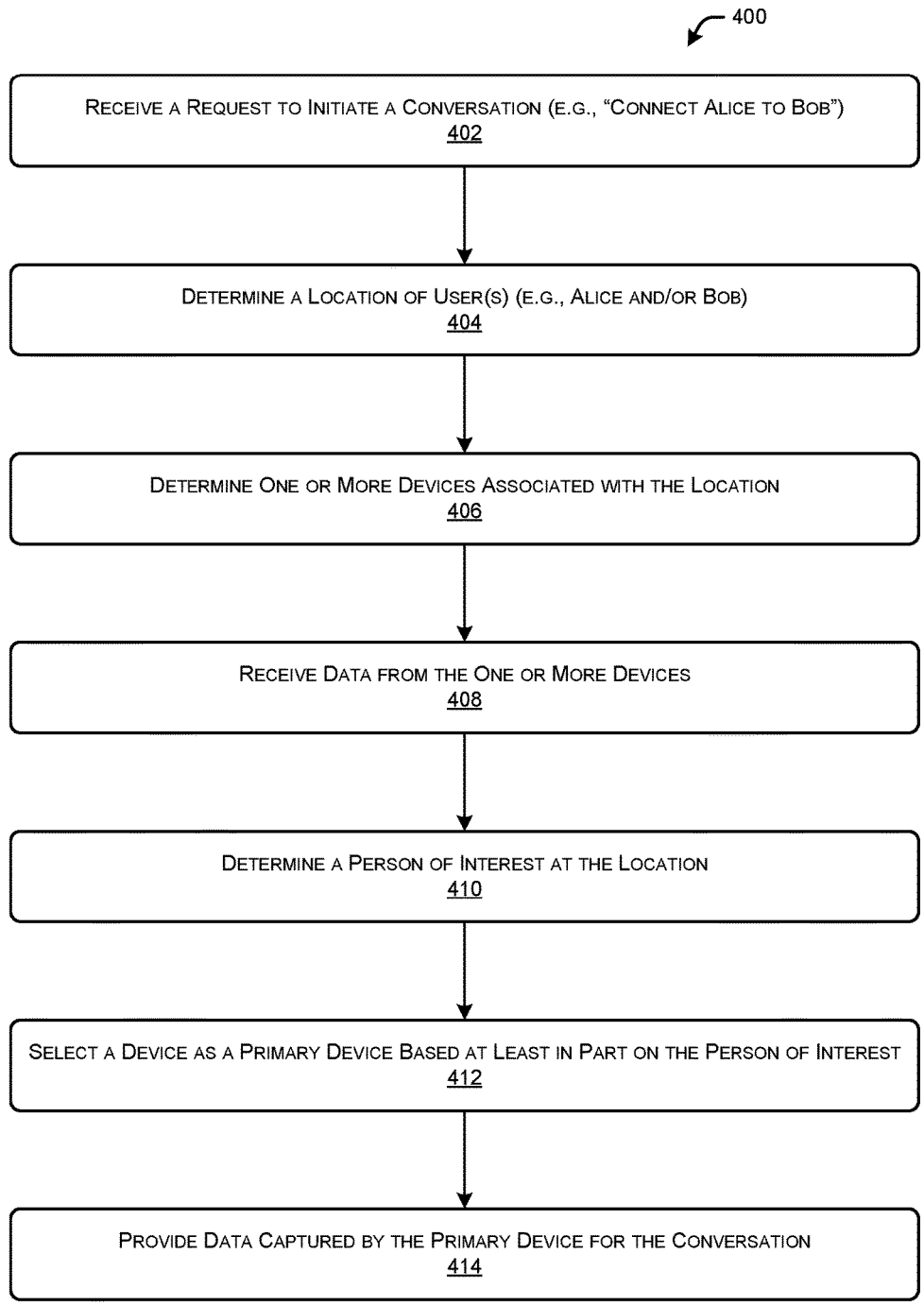
FIG. 4 illustrates an example flow diagram of a process for initiating a communication and selecting a device of a plurality of devices for providing data for the video communication.
Figure 5:
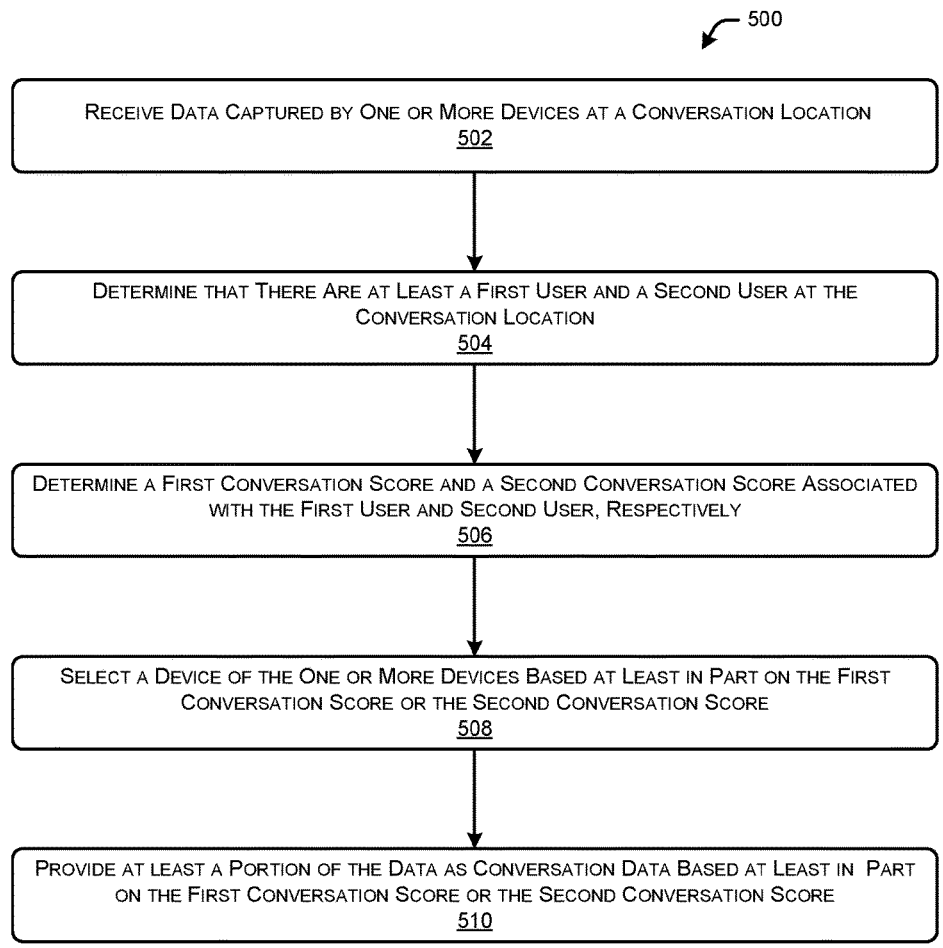
FIG. 5 illustrates an example flow diagram of a process for selecting a device for a video communication based at least in part on conversation scores associated with different users.
Figure 6:
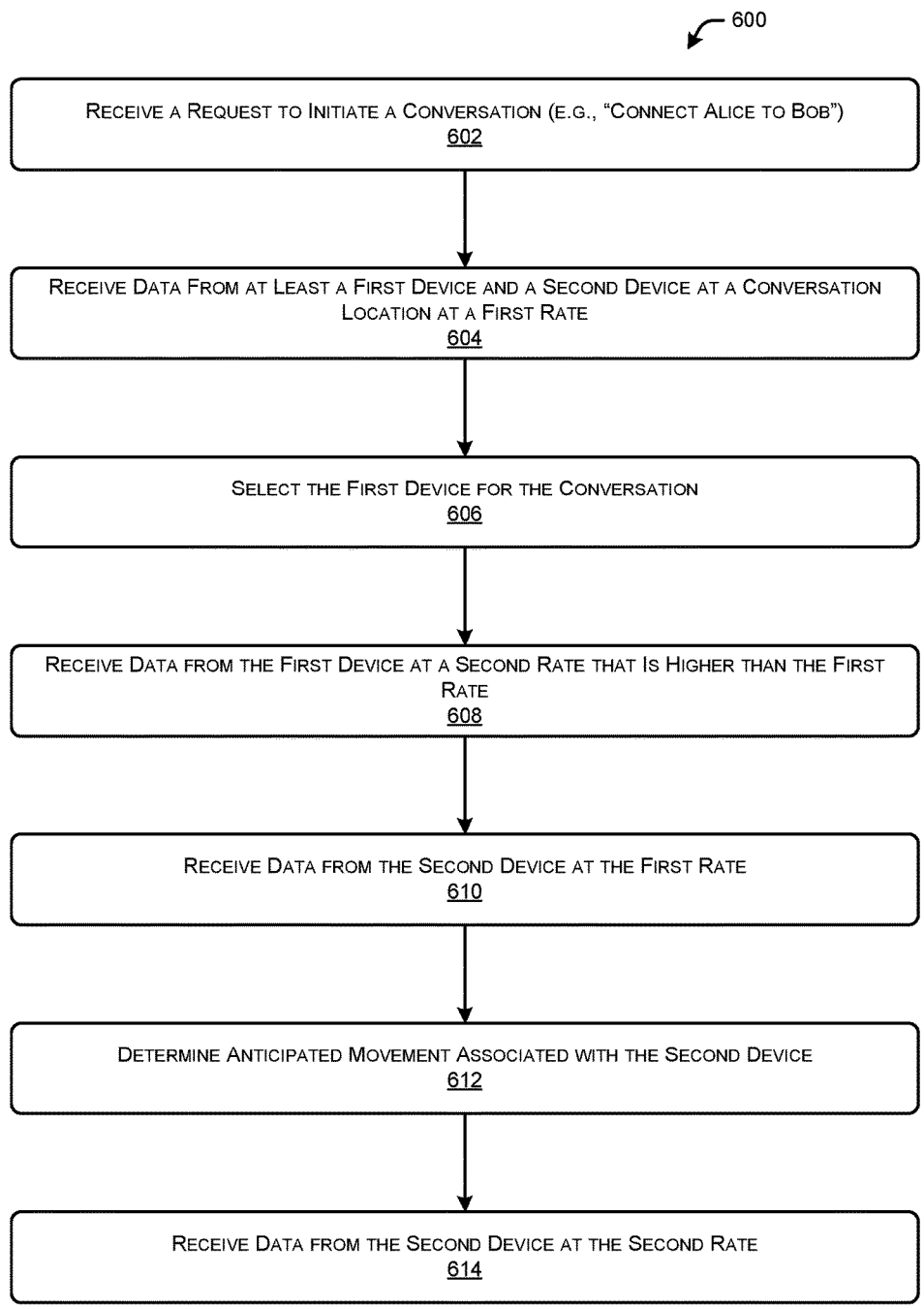
FIG. 6 illustrates an example flow diagram of a process for modulating data rates of devices for facilitating a video communication.

FIGS. 4-6 illustrate example processes in accordance with embodiments of the disclosure. Each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media can include non-transitory computer-readable storage media, which can include hard drives, floppy diskettes, optical discs, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media can include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

FIG. 4 illustrates an example flow diagram of a process 400 for initiating a communication and selecting a device of a plurality of devices for providing data for the video communication. For example, aspects of the process 400 can be performed by the network device 126, as illustrated in FIGS. 1 and 2.

At 402, the operation can include receiving a request to initiate a communication, for example, between a first user and a second user. In some examples, the request can be a request for a communication session. Further, the request can include a natural-language command, a gesture, and/or a GUI request associated with a computing device. In some instances, the request to initiate the communication can refer only to the individual users, and not to the devices associated with the users (e.g., "Connect Alice to Bob"). In some instances, the request can specify a mode of communication (e.g., voice or video), while in some instances, the mode of communication may not be specified. In some instances, the operation 402 can include performing automated speech recognition on a natural-language command to determine text corresponding to speech contained in an audio signal, and in some instances, the command can be determined from the determined text.

At 404, the operation can include determining a location of one or more users within a respective environment. For example, the operation 404 can include determining a location of a first user (e.g., corresponding to a user initiating the communication in the operation 402), while in some cases, the operation 404 can include determining a location of a second user (e.g., corresponding to the target/recipient of the request). In some instances, the location of the first user can be determined by operations and processes at the first location independent of any operations associated with the second user. That is to say, aspects of the process 400 can be performed in parallel for operations associated with the first user and for operations associated with the second user. For example, as discussed above, in some instances, the operations of the network device 126 can be distributed between a remote network device and a local network device located at an environment associated with a user. Thus, when the request is received in the operation 402, an indication to locate the first user can be transmitted to a local network device associated with the first user, and an indication to locate the second user can be transmitted to a local network device associated with the second user. In some instances, a location of a user is continuously monitored and stored in memory. Thus, when a communication is requested between a first user and a second user, for example, the stored locations of the users are used to determine appropriate devices for the communication. As a location of a user changes, the location can be updated in memory, such as memory of the network device 126. In some instances, the operation 404 can be performed via face recognition, voice recognition, analyzing RF signals, etc., as described above in connection with FIGS. 1 and 2.

At 406, the operation can include determining one or more devices associated with the location. For example, the operation 406 can include determining a user profile associated with a user and/or determining a device group associated with the user profile and/or the location. As discussed herein, a device group can include any number of devices with any associated capabilities, such as capturing audio and/or images, and/or presenting audio and/or images. As further discussed herein, the device groups can be determined explicitly or implicitly, based on user interactions, observed movement, image processing, etc.

At 408, the operation can include receiving data from the one or more devices. In some instances, the one or more devices can be part of the device group determined in the operation 406. In some instances, the operation 408 can include instructing the one or more devices to capture audio and/or image data of an environment. In some instances, the operation 408 can include requesting data at a particular bit rate, resolution, frame rate, etc., associated with the one or more devices.

At 410, the operation can include determining a person of interest at the location. For example, the operation 410 can include processing the data received in the operation 408 to determine one or more users represented in the data (e.g., by voice recognition, face recognition, etc.). In some instances, the operation 410 can include analyzing image data, for example, received from one or more imaging devices to determine an optimal view of persons represented in the image data. In some instances, the operation 410 can include determining a conversation score for one or more users based at least in part on a level of engagement of the user with the one or more devices.

At 412, the operation can include selecting a device as a primary device based at least in part on the person of interest. For example, the operation 412 can include utilizing one or more machine learning algorithms to determine an optimal view of a user designated as a person of interest for a conversation. Further, selecting a device as the primary device can be based on one or more preferences associated with a user profile, for example. In some cases, user preferences can indicate which devices are to be used for particular types of communication (e.g., voice, video, etc.), between particular users, time of the day, a context of the communication, objects present in the field of view associated with an imaging device, restricted areas of an environment, a number of users in an environment, etc.

At 414, the operation can include providing data captured by the primary device for the conversation. In some examples, the operation 414 can include transmitting the data to one or more far-end devices, such as a television or display for presentation. In some instances, the operation 414 can include processing the data, such as cropping or zooming to frame the person of interest according to an optimal view and/or user preferences. In some instances, the operation 414 can include combining data from multiple devices, for example, to present representations of multiple users as part of a seamless video communication.

FIG. 5 illustrates an example flow diagram of a process 500 for selecting a device for a video communication based at least in part on conversation scores associated with different users. For example, aspects of the process 500 can be performed by the network device 126, as illustrated in FIGS. 1 and 2.

At 502, the operation can include receiving data captured by one or more devices at a conversation location. By way of example, and without limitation, the conversation location can correspond to the environments 106, 112, 302, and 304, and accordingly, the one or more devices can correspond to devices associated with the individual environments. In some instances, the operation 502 can include receiving a request to establish a communication at the conversation location, and/or receiving a request to establish a communication with a user profile associated with the conversation location. Further, the operation 502 can include determining a group of one or more devices associated with the conversation location. In some instances, the operation 502 can include instructing the one or more devices to capture data and transmit data to the network device 126, for example. In some instances, the operation 502 can include receiving image data, audio data, RF data, biometric data, etc., from the conversation location.

At 504, the operation can include determining that there are at least a first user and a second user at the conversation location. In some cases, the operation 504 can include processing the data received in the operation 502 via one or more of voice recognition, facial recognition, RF identification, biometric identification, etc., to determine an identity of users (e.g., to determine a user profile associated with the respective users) and/or to determine that there is more than one user in an environment. By way of example, and without limitation, the first user and the second user can correspond to the user 318 "Bob" and the user 322 "Victor," respectively. In some instances, the operation 504 can include identifying users in a same field of view or identifying users in a plurality of fields of view representing data captured by various devices.

At 506, the operation can include determining a first conversation score and a second conversation score associated with the first user and the second user, respectively. For example, a conversation score can be based at least in part on one or more of: a relative size of the user in image data; an identity of the user corresponding to a request to initiate the conversation; the user speaking; movement of the user; an amount of time the user is represented in data over time; a context of the conversation; an orientation of the user relative to an imaging device; etc. As can be understood, any number of factors can be used to determine a conversation score indicating a relative "importance" of the user in a conversation, and/or indicating a level of engagement in the conversation; user preferences; express indication(s); etc.

At 508, the operation can include selecting a device of the one or more devices based at least in part on the first conversation score or the second conversation score. For example, in a case where the first user has a highest conversation score, the operation 508 can include selecting a device of the one or more devices that provides an optimal view of the first user. In some instances, the operation 508 can include determining a relative differential between the first conversation score and the second conversation score.

In some cases, a device can be selected based at least in part on the relative difference being above a threshold. In some instances, individual devices can be selected to capture data representing the first and second users if the first and second conversation scores are above a threshold value.

At 510, the operation can include providing at least a portion of the data as conversation data based at least in part on the first conversation score or the second conversation score. For example, if the data received in the operation 502 corresponds to a plurality of devices, the operation 510 can include providing data corresponding to the selected device to a far-end device. In some cases, the operation 510 can include performing image analysis such as zooming or cropping, and in some cases, the operation can include instructing the device to change a yaw, tilt, roll, or orientation of the image capture device in general to capture image data based on the first and second conversation scores.

FIG. 6 illustrates an example flow diagram of a process 600 for modulating data types of devices for facilitating a video communication. For example, aspects of the process 600 can be performed by the network device 126, as illustrated in FIGS. 1 and 2.

At 602, the operation can include receiving a request to initiate a conversation. For example, the operation 602 can substantially correspond to the operation 402 of FIG. 4. Further, the operation 602 can include determining at least two devices capable of capturing data for the conversation. In some cases, the operation 602 can include receiving the request, determining a user profile associated with the request, and determining the at least two devices associated with the user profile.

At 604, the operation can include receiving data from at least a first device and a second device at a conversation location at a first rate. For example, the first rate corresponds to a first bit rate, first frame rate, first codec, first compression rate, first resolution, etc., which generally corresponds to a quality of data provided by the first device and the second device. In some instances, the first rate can be lower than a rate utilized by the network device to provide a non-degraded real time conversation.

At 606, the operation can include selecting the first device for the conversation. For example, the operation 606 can determine that the first device provides an optimal field of view for the person of interest of the conversation, or the like, such that the primary device is to be considered as the primary device for capturing data at the conversation location.

At 608, the operation can include receiving data from the first device at a second rate that is higher than the first rate. For example, the second rate can correspond to a quality of data to provide a seamless real time conversation. By way of example, and without limitation, the second rate can correspond to 60 frames per second of image data, while the first rate can correspond to 2 frames per second of image data. Thus, the operation 608 can include instructing the first device to capture data at the second rate.

At 610, the operation can include receiving data from the second device at the first rate. For example, and as indicated above, the first rate can correspond to a lower quality of data compared to the second rate. However, network device can receive the data from the second device at the first rate to monitor the data to determine if one or more of video data or image data from the second device provides a higher quality of data compared to the first device. Further, the network device can monitor the data from the second device to determine if a state of the conversation location (e.g., an environment) has changed to determine if another person is to be designated as a person of interest.

At 612, the operation can include determining anticipated movement associated with the second device. For example, the operation 612 can include the network device 126 analyzing the data provided by the first device to perform object tracking (e.g., of a user or the person of interest). Based at least in part on the object tracking, the operation 612 can include determining a confidence level or likelihood that an object will move from a field of view of the first device, for example, to a field of view of the second device. In some instances, the operation 612 can include access a database or stored information regarding a layout of the conversation location and relative locations of the first and second devices in an environment.

At 614, the operation can include receiving data from the second device at the second rate, for example, based at least in part on determining that the anticipated movement indicates that optimal image data may be captured by the second device. For example, the operation 614 can include upgrading a quality of data received from the second device in anticipation of transitioning the primary device status from the first device to the second device. Thus, by increasing a quality of data received at the network device from the first rate to the second rate, the network device can make more accurate predictions and/or determinations about the conversation data, and/or can provide the data from the second device to a far-end location for a seamless conversation experience, for example.

Figure 7:
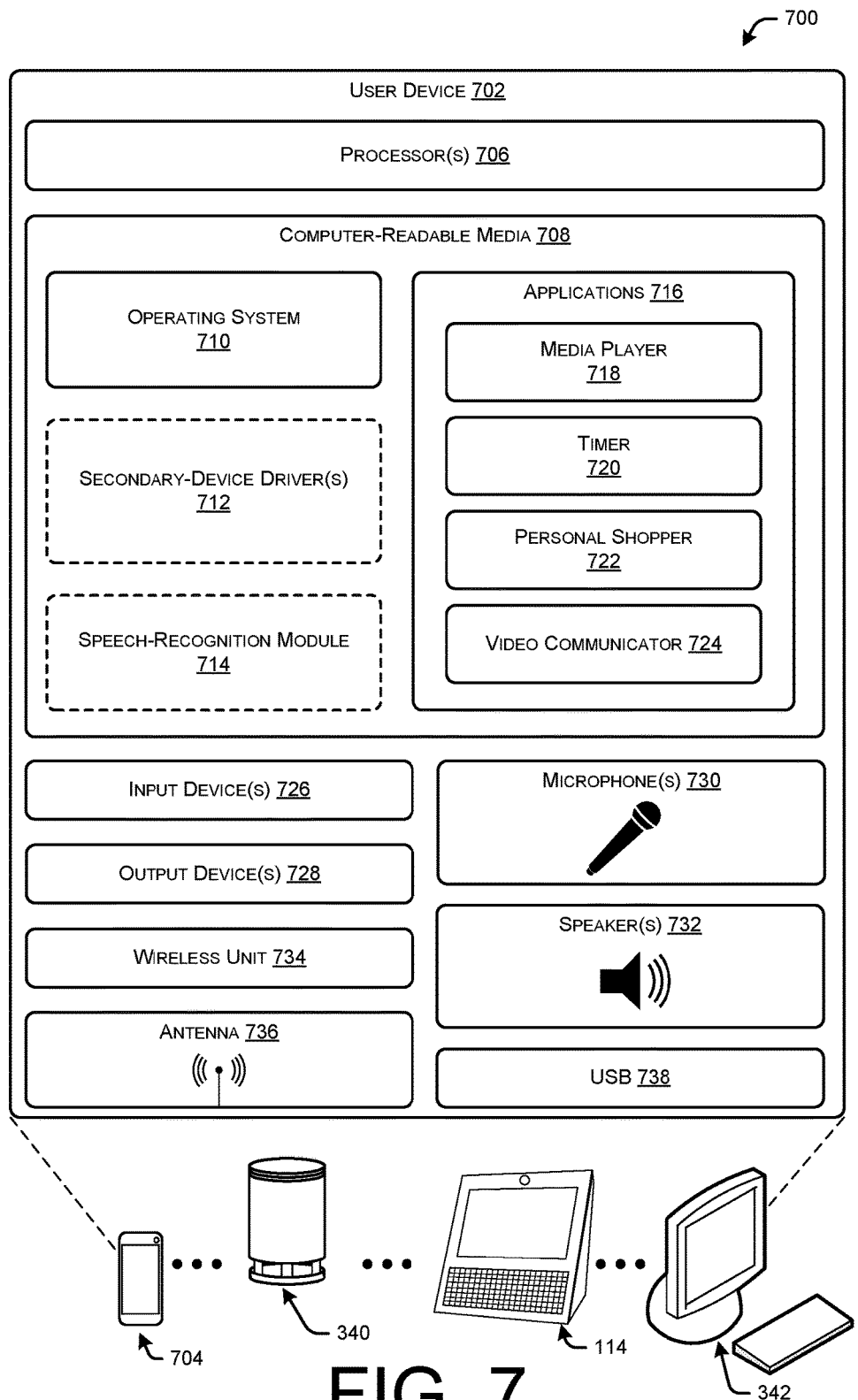
FIG. 7 shows a functional block diagram of selected components implemented as a user device.

FIG. 7 shows a functional block diagram 700 of selected components implemented as a user device.

In some instances, the user device 702 can be implemented as a standalone device 702 that is relatively simple in terms of functional capabilities with limited input/output components, memory, and processing capabilities. For instance, the user device may not have a keyboard, keypad, or other form of mechanical input (e.g., represented as a voice-controlled device 340). In some cases, the user device 702 may not have a display (other than simple lights, for instance) or touch screen to facilitate visual presentation and user touch input. Instead, the device 702 can be implemented with the ability to receive and output audio, a network interface (wireless or wire-based), power, and processing/memory capabilities. In certain implementations, a limited set of one or more input components can be employed (e.g., a dedicated button to initiate a configuration, power on/off, etc.). Nonetheless, the primary and potentially only mode of user interaction with the device 702 is through voice input and audible output. In some instances, the device 702 can simply comprise a microphone, a power source (e.g., a battery), and functionality for sending captured audio signals to another device.

The user device 702 can be implemented as a standalone imaging device capable of capturing and presenting audio and video, such as illustrated as the imaging device 114. However, in some cases, the user device 702 may lack a keyboard, although a user can interact with the user device 702 via voice instruction, gestures, or through a touchscreen.

The user device 702 can also be implemented as a mobile device 704 such as a smart phone or personal digital assistant. The mobile device 704 can include a touch-sensitive display screen and various buttons for providing input as well as additional functionality such as the ability to send and receive telephone calls. Alternative implementations of the user device 702 can also include configuration as a personal computer 342. The personal computer 342 can include a keyboard, a mouse, a display screen, and any other hardware or functionality that is typically found on a desktop, notebook, netbook, or other personal computing devices. The devices 702, 704, 114, 340, and 342 are merely examples and not intended to be limiting, as the techniques described in this disclosure can be used in essentially any device that has an ability to recognize speech input or other types of natural language input, and to capture and/or present image data.

In the illustrated implementation, the user device 702 includes one or more processors 706 and computer-readable media 708. In some implementations, the processors(s) 706 can include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 706 can possess its own local memory, which also can store program modules, program data, and/or one or more operating systems.

The computer-readable media 708 can include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 708 can be implemented as computer-readable storage media ("CRSM"), which can be any available physical media accessible by the processor(s) 706 to execute instructions stored on the memory 1204. In one basic implementation, CRSM can include random access memory ("RAM") and Flash memory. In other implementations, CRSM can include, but is not limited to, read-only memory ("ROM"), electrically erasable programmable read-only memory ("EEPROM"), or any other tangible medium which can be used to store the desired information and which can be accessed by the processor(s) 706.

Several modules such as instruction, data stores, and so forth can be stored within the computer-readable media 708 and configured to execute on the processor(s) 706. A few example functional modules are shown as applications stored in the computer-readable media 708 and executed on the processor(s) 706, although the same functionality can alternatively be implemented in hardware, firmware, or as a system on a chip (SOC).

An operating system module 710 can be configured to manage hardware and services within and coupled to the device 702 for the benefit of other modules. In addition, in some instances the device 702 can include some or all of one or more secondary-device drivers 712 for interacting with various devices in a user environment. In other instances, meanwhile, the device 702 can be free from the drivers 712 for interacting with the various devices. The device 702 can further including, in some instances, a speech-recognition component 714 that employs any number of conventional speech processing techniques such as use of speech recognition, natural-language understanding, and extensive lexicons to interpret voice input. In some instances, the speech-recognition component 714 can simply be programmed to identify the user uttering a predefined word or phrase (i.e., a "wake word"), after which the device 702 can begin uploading audio signals to the network device 126 for more robust speech-recognition processing. In other examples, the device 702 itself can, for example, identify voice commands from users and can provide indications of these commands to the network device 126. In some instances, the device 702 can continuously listen to audio in an environment to determine a location of a user. In some instances, a continuous audio stream can be analyzed at a computing device location in an environment of the user, while selectively uploading audio to a network device remote from the environment.

The user device 702 can also include a plurality of applications 716 stored in the computer-readable media 708 or otherwise accessible to the user device 702. In this implementation, the applications 716 are a media player 718, a timer 720, a personal shopper 722, and a video communicator 724. However, the user device 702 can include any number or type of applications and is not limited to the specific examples shown here. The media player 718 can be configured to play songs or other audio files, and/or can be configured to play movies or other audio visual media. The timer 720 can be configured to provide the functions of a simple timing device and clock. The personal shopper 722 can be configured to assist a user in purchasing items from web-based merchants. And the video communicator 724 can be configured to facilitate a video communication (or audio-only communication), as discussed herein.

Generally, the user device 702 has input devices 726 and output devices 728. The input devices 726 can include a keyboard, keypad, mouse, touch screen, joystick, control buttons, image sensor, etc. In some implementations, one or more microphones 730 can function as input devices 726 to receive audio input, such as user voice input. The output devices 728 can include a display, a light element (e.g., LED), a vibrator to create haptic sensations, or the like. In some implementations, one or more speakers 732 can function as output devices 728 to output audio sounds.

A user can interact with the user device 702 by speaking to it, and the one or more microphone(s) 730 captures the user's speech. The user device 702 can communicate back to the user by emitting audible statements through the speaker 732. In this manner, the user can interact with the user device 702 solely through speech, without use of a keyboard or display.

Similarly, in some implementations, a user can interact with the user device 702 thorough one or more of an image sensor and/or touchscreen included with the user device. In some instances, the user can use any combination of voice control, gestures, touchscreen input, etc. to interact with the user device 702. In some instances, a user can interact with the user device 702 via one or more companion applications operating on a smartphone, for example, separate and distinct from the user device 702.

The user device 702 can further include a wireless unit 734 coupled to an antenna 736 to facilitate a wireless connection to a network. The wireless unit 734 can implement one or more of various wireless technologies, such as Wi-Fi, Bluetooth, RF, and so on. A USB port 738 can further be provided as part of the device 702 to facilitate a wired connection to a network, or a plug-in network device that communicates with other wireless networks. In addition to the USB port 738, or as an alternative thereto, other forms of wired connections can be employed, such as a broadband connection.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more processors; and
   one or more computer-readable media storing computer-executable instructions that, when executed by the one or more processors, cause the one or more processors to:
   receive a request to establish a communication session from a first user profile and with a second user profile;
   determine a device group associated with the first user profile, the device group including at least a first imaging device having a first field of view and a second imaging device having a second field of view, the first imaging device and the second imaging device located in an environment associated with the first user profile with at least a first portion of the first field of view overlapping with at least a second portion of the second field of view;
   receive first image data of the environment captured by the first imaging device;
   receive second image data of the environment captured by the second imaging device;
   determine that the first image data includes a first representation of a first user associated with the first user profile;
   determine that the second image data includes a second representation of the first user;
   determine one or more user preferences associated with the first user profile indicating a preference for framing the first user in image data;
   determine a first score associated with the first image data using an algorithm, wherein first inputs to the algorithm include at least the one or more preferences and at least a portion of the first image data, wherein the algorithm is configured to determine a score representing facial detection in the first image data;
   determine a second score associated with the second image data using the algorithm, wherein second inputs to the algorithm include at least the one or more preferences and at least a portion of the second image data;
   select the first imaging device as a primary device for the communication session based at least in part on the first score and the second score;
   receive third image data from the first imaging device, the third image data including a third representation of the first user; and
   send at least a portion of the third image data for presentation via a display associated with the second user profile.

2. The system of claim 1, wherein the computer-executable instructions, when further executed by the one or more processors, further cause the one or more processors to:

generate cropped image data from the third image data, the cropped image data being a subset of the third image data and including the third representation of the first user; and send the cropped image data for presentation via the display associated with the second user profile.

3. The system of claim 1, wherein the computer-executable instructions, when further executed by the one or more processors, further cause the one or more processors to:

receive fourth image data captured by the first imaging device;

determine that a third user and the first user are represented in the fourth image data;

determine a first conversation score associated with the first user based on first utterances of the first user;

determine a second conversation score associated with the third user based on second utterances of the third user;

determine that the first user is a person of interest based at least in part on the first conversation score; and send at least a portion of the fourth image data for presentation via the display associated with the second user profile.

4. The system of claim 1, wherein the first image data is associated with a first frame rate, and wherein the computer-executable instructions, when further executed by the one or more processors, further cause the one or more processors to instruct the first imaging device to capture the third image data at a second frame rate based at least in part on the first imaging device being selected as the primary device, wherein the second frame rate is higher than the first frame rate.

5. The system of claim 1, wherein the second score is associated with a first time, and wherein the computer-executable instructions, when further executed by the one or more processors, further cause the one or more processors to:

determine a third score based at least upon fourth image data captured by the second imaging device at a second time, the fourth image data associated with a first frame rate;

determine that the third score is above a threshold score value; and instruct the second imaging device to provide fifth image data associated with a second frame rate that is higher than the first frame rate based at least in part on the third score being above the threshold score value.

6. A system comprising:

one or more processors; and one or more computer-readable media storing computer-executable instructions that, when executed by the one or more processors, cause the one or more processors to:

receive a request to establish a communication session from a first user profile and with a second user profile;

receive first image data from a first imaging device located in an environment associated with the first user profile, the first image data including a first representation of a user;

receive second image data from a second imaging device located in the environment, the second image data including a second representation of the user;

determine one or more preferences associated with the first user profile;

determine a score associated with the first image data based at least in part on the one or more preferences and a direction the user is facing with respect to the first imaging device;

select, based at least in part on the score, the first imaging device as a primary device; and send at least a portion of the first image data from the first imaging device to a device associated with the second user profile.

7. The system of claim 6, wherein the score is a first score evaluating the first representation of the user in the first image data, and wherein the computer-executable instructions, when further executed by the one or more processors, further cause the one or more processors to:

determine a second score evaluating the second representation of the user in the second image data;

determine that the first score is higher than the second score; and select the first imaging device as the primary device based at least in part on the first score being higher than the second score.

8. The system of claim 6, wherein the computer-executable instructions, when further executed by the one or more processors, further cause the one or more processors to evaluate at least one of the first image data or the second image data using a machine learned algorithm based at least in part on facial detection.

9. The system of claim 6, wherein the computer-executable instructions, when further executed by the one or more processors, further cause the one or more processors to:

determine a device group associated with the first user profile, wherein the first imaging device and the second imaging device are included in the device group.

10. The system of claim 6, wherein the one or more preferences associated with the first user profile include one or more of a cropping preference, a zooming preference, a device preference, historical usage information, or an image composition preference.

11. The system of claim 6, wherein the user is a first user, and wherein the computer-executable instructions, when further executed by the one or more processors, further cause the one or more processors to:

receive third image data from the first imaging device or the second imaging device including a third representation of a second user and a fourth representation of the first user in the environment;

determine a first conversation score associated with the first user;

determine a second conversation score associated with the second user;

determine that the second conversation score is below a conversation score threshold; and generate cropped image data from the third image data, the cropped image data being a subset of the third image data including the fourth representation of the first user.

12. The system of claim 6, wherein the first image data is associated with a first rate, and wherein the computer-executable instructions, when further executed by the one or more processors, further cause the one or more processors to instruct the first imaging device to capture third image data at a second rate based at least in part on the first imaging device being selected as the primary device, wherein the second rate is higher than the first rate, the second rate associated with at least one of image resolution, frame rate, or bit rate.

13. The system of claim 6, wherein the user is a first user, and wherein the computer-executable instructions, when further executed by the one or more processors, further cause the one or more processors to:

determine that the second image data includes a representation of a second user;
determine a conversation score associated with the second user;
determine that the conversation score is above a conversation score threshold;
send at least a portion of the second image data to the device associated with the second user profile; and
instruct the device to present at least a portion of the first image data and the second image data for display.

14. The system of claim 6, wherein the computer-executable instructions, when further executed by the one or more processors, further cause the one or more processors to:
receive an audio signal captured by the second imaging device; and
send the audio signal captured by the second imaging device to the device associated with the second user profile for presentation along with the first image data from the first imaging device.

15. A method comprising:
receiving a request to establish a communication session from a first user profile and with a second user profile;
receiving first image data from a first imaging device located in an environment associated with the first user profile, the first image data including a first representation of a user;
receiving second image data from a second imaging device located in the environment associated with the first user profile, the second image data including a second representation of the user;
determining one or more preferences associated with the first user profile;
determining at least a score associated with the first image data based at least in part on the one or more preferences and a direction the user is facing with respect to the first imaging device;
selecting, based at least in part on the score, the first imaging device as a primary device; and
sending at least a portion of the first image data from the first imaging device to a device associated with the second user profile.

16. The method of claim 15, wherein the score is a first score evaluating the first representation of the user in the first image data, the method further comprising:
determining a second score evaluating the second representation of the user in the second image data;
determining that the first score is higher than the second score; and
selecting the first imaging device as the primary device based at least in part on the first score being higher than the second score.

17. The method of claim 15, wherein the one or more preferences include one or more of a cropping preference, a zooming preference, a device preference, historical usage information, or an image composition preference.

18. The method of claim 15, wherein the user is a first user, the method further comprising:
receiving third image data from the first imaging device or the second imaging device including a third representation of a second user and a fourth representation of the first user in the environment;
determining a first conversation score associated with the first user;
determining a second conversation score associated with the second user;
determining that the second conversation score is below a conversation score threshold; and
generating cropped image data from the third image data, the cropped image data being a subset of the third image data including the fourth representation of the first user.

19. The method of claim 15, wherein the first image data is associated with a first rate, the method further comprising capturing third image data at a second rate based at least in part on the first imaging device being selected as the primary device, wherein the second rate is higher than the first rate, the second rate associated with at least one of image resolution, frame rate, or bit rate.

20. The method of claim 15, wherein the user is a first user, the method further comprising:
determining that the second image data includes a representation of a second user;
determining a conversation score associated with the second user;
determining that the conversation score is above a conversation score threshold;
sending at least a portion of the second image data to the device associated with the second user profile; and
instructing the device to present at least a portion of the first image data and the second image data for display.

* * * * *